(12) United States Patent
Pipenburg (10) Patent No.: US 6,829,787 B1
(45) Date of Patent: Dec. 14, 2004

(54) WATER SAVING DUAL FLUSH SYSTEM OF VALVING

(76) Inventor: Charles G. Pipenburg, P.O. Box 2527, Paso Robles, CA (US) 93447

( * ) Notice: Subject to any disclaimer, the term of this patent is extended or adjusted under 35 U.S.C. 154(b) by 0 days.

(21) Appl. No.: 10/661,799

(22) Filed: Sep. 12, 2003

(51) Int. Cl.$^7$ ................................................ E03D 1/35

(52) U.S. Cl. ............................................. 4/393; 4/394

(58) Field of Search ..................................... 4/392–394

(56) References Cited

U.S. PATENT DOCUMENTS

| | | | | |
|---|---|---|---|---|
| 3,964,109 A | * | 6/1976 | Street et al. | .................... 4/327 |
| 4,160,294 A | * | 7/1979 | Crumby | ........................ 4/324 |
| 4,937,894 A | * | 7/1990 | Hill et al. | ....................... 4/324 |
| 6,263,520 B1 | * | 7/2001 | Song | .............................. 4/325 |
| 6,381,765 B1 | * | 5/2002 | Liu | ................................ 4/404 |

* cited by examiner

*Primary Examiner*—Charles E. Phillips (57) ABSTRACT

A water saving dual flush system of valving assembly for toilet water-closets of the gravity flow type. This system of valving is designed to fit existing hardware in typical water-closets and convert single flush designs to dual flush water saving systems. Comprised of a flapper type bottom valve having a port located at a position above the discharge pipe of a common water-closet. The port edge of the bottom valve being molded to receive and mate to a flanged pipe end and thereby forming a watertight seal between the pipe and the bottom valve. A floatation collar being attached about the outside of the pipe. The upper end of the pipe having a upper valve seat sleeve attached. The upper valve seat sleeve being a slip-fit sleeve with a valve seat formed on the upper end and having a hinge portion incorporated on one side. The upper valve seat sleeve hinge is designed to mate to the upper valve and form together a hinged mount. The bottom end of the valve seat sleeve being flared to retain the floatation collar. The upper valve having a mating hinge mount attachment point to mate with the upper valve seat sleeve hinge. The upper valve being non-buoyant (depending on the application). The upper valve having a chain attachment point for flush actuation connection to the flush arm and thereby to the flush handle. The chain also having attached a float by which the upper valve is operatively adjusted.

6 Claims, 9 Drawing Sheets

WATER SAVING DUAL FLUSH SYSTEM OF VALVING

CROSS-REFERENCE TO RELATED APPLICATIONS

Not Applicable

BACKGROUND

1. Field of Invention

This invention relates to plumbing products particularly to water saving dual flush valves for gravity flow toilet water-closets.

2. Description of Prior Art

The need for water conservation is widely recognized as an issue that must be addressed by all people. Drought and pollution in addition to over use of limited resources have led to fresh water shortages in many parts of the world. Some communities have placed limits on the use of water and provide for fines when users exceed their limit. Cities are now, at considerable expense, recycling waste water back in to the fresh water supply. Some communities have limited their growth due to the lack of fresh water and over use demands on waste treatment facilities.

One of the ways in which fresh water is over used and wasted is in the toilet flush system. An estimated average use of 40% of the total of household water consumption is flushed from the toilet to the sewer or septic systems. It is now understood that significant amounts of fresh water can be saved by making more efficient toilet flush systems. Older toilet water-closets were not designed with water conservation in mind and may typically use five or more gallons of water per flush (gpf). Water-closets designed after 1980 were designed to hold a smaller amount and will typically use 3.5 gpf. Now, as of 1994, it is necessary for all U.S. made water-closets to use only 1.6 gpf on average. It is now becoming common for commnunities to provide expensive replacement low flow toilets in an effort to curtail water usage and waste water treatment burdens.

This recognized necessity to conserve water has created the need to develop a more efficient way of regulating water use in new and existing toilet flush systems. The prior art is plentiful in this field and shows many attempts at inventing ways to economize the flush system. Some of the more popular ways that the problem has been addressed are to utilize means to limit the amount of water used by causing the flush cycle to terminate early and thereby save water. Other methods utilize water displacement systems such as water dams or containers within the water-closet to reduce the amount of useable water per flush. Still others use two valves located at different levels within the water closet thereby providing selective dual flush modes. Some systems require the user to manually hold the flush valve open throughout the flush cycle to achieve desired results.

U.S. Pat. No. 5,129,110 to Richter (1992) shows an early close valve system that contains a weight in the valve to make it non-buoyant allowing selective flush, however, the user must manually hold open the. valve to operate the system throughout the entire flush process.

U.S. Pat. No. 6,510,563 to Jarosiinski et al. (2003) shows a flush valve adapter for converting to dual flush by using two valves located at different levels within the water closet. This system requires that the toilet be disassembled and retrofitted with new hardware including dual flush arms for activation of the two flush modes. These types of system require more room in the very limited water-closet space and may not be universal in their fitment.

U.S. Pat. No. 5,195,190 to Nguyen-Huu (1993) shows a type of water darn utilizing an extension devise to raise the outlet level within the water closet. This system requires retrofit of the existing hardware in the water closet and only allows one volume of flush for all applications.

U.S. Pat. No. 4,485,501 to Kloner (1984) and U.S. Pat. No. 5,511,253 to Zamudio-Castillo et al. (1996) both show complicated systems of hardware arranged in the water closet to allow dual flush modes. These systems require precise adjustment of multiple levers and connecting arms with multiple arms and other attachments connectively relying on each other for proper function.

Some of the major drawbacks of these and other current inventions are that they require major modification of existing hardware in the water-closets or they simply will not work in current water-closet toilet design systems. Some systems are so complicated that they make reliability doubtful. Additionally, cost and difficult instillation are barriers to popularity and wide spread use. Some developments require the user to make due with one small inefficient volume of water for all flush needs thereby resulting in the need for multiple flushes to clear the bowl.

It has been noted by research done after low flow toilets have been installed (five year followup) that replacement low flow valves are not readily available and that most replacement valves used are not of the original low flow type and thereby the water saving effort is negated. Follow-up research done on low flow toilets shows that approximately 42.9% of these water saving toilet systems experience problems from leaks, clogs, inefficient flush, or excessive water use.

Many of the single flush systems try to accommodate liquid and solid waste removal with one volume of flush water. This attempt to compromise results in over use for liquids and inefficient volumes for solids. Low volume flushes are often the cause of clogs due to inefficient drain-line carry. Plumbing systems are engineered and constructed to function with predetermined volumes of waste water flow. Therefore, changing to low flow single flush toilets or single flush valving will prove inefficient in many applications. Additionally, most toilets are designed to use larger volumes of water to create scorer and scrub turbulence in the flush action to throughly clean the bowl. The flush cleaning turbulence action of larger water volumes is not necessary when clearing liquid and tissue waste only. Government sponsored toilet replacement programs are expensive and problematic in that they require professional instalation and create waste by scraping the old toilet. Many people will not accept trading in their older reliable toilet for one that is of greater cost and less reliability. Toilet replacement and water recycling programs are very long term projects that do not fulfill immediate needs to conserve water and energy resources.

SUMMARY

It is therefore necessary to develop a water saving flush system that fits and works with existing toilet structures and hardware. Likewise it is necessary to provide a flush system that is inexpensive to manufacture, purchase, distribute, and install. To be accepted by the public a water saving flush system must reliably perform its intended function without any complicated use techniques to learn. Also, it is necessary to utilize two flush modes to take advantage of maximum water savings while still getting the job done to the satisfaction of the user. Likewise it is necessary to develop a flush system that will work with existing plumbing designs in order to completely clear both the toilet bowl and the sewer lines. It is also desirable to have a simple retrofit water saving flush system of valving that can be made immediately available to entire communities. It is likewise necessary for the 1.6 gpf standard to be achieved in new applications to allow manufactures to certify their products. Most importantly, it is necessary to develop a toilet flush system that will save water and energy resources while reducing demands on waste water treatment and fresh water delivery systems.

OBJECTS AND ADVANTAGES

It is the object and advantage of the present invention to provide a water saving dual flush system of valving for gravity flow toilets. Further objects and advantages of the present invention are as follows:

(a) Provides the user with the option of water saving low volume flushes for liquid waste or larger flush volume for complete removal of solids.
(b) To provide a dual flush valving system that fits in existing water-closets without modification to existing hardware.
(c) Fully functional with both single flush handle arrangements and dual handle flush actuation assemblies.
(d) A valving system that can be installed in seconds by any ordinary person without tools. No need for an expensive professional plumber to install.
(e) A dual flush valving system that can be operatively learned the first time used.
(f) A user friendly flush system that is fully automatic flush and forget technology with no need for the operator to stand by and manually operate the system. The toilet will automatically refill and be ready for the next use.
(g) To provide a dual flush valving system that is based on proven, reliable technology.
(h) To provide a complete valving retrofit system that is both low cost to manufacture and purchase.
(I) A dual flush valving system that is adjustable for compatibility with various water-closet designs and can be pre-set to meet specific water use requirements.
(j) To provide satisfactory drain-line carry flow characteristics to prevent clogs and drain-line corrosion. Additionally, proper volumes of water prevent the need for double flushing.
(k) To dramatically reduce the percentage of wasted water flushed to the sewer system and reduce the amount of waste water treatment needed by that same amount.
(l) To relieve the burden on fresh water supply systems and save the energy previously required to deliver water. Well pumps and transfer pwnps will require less run time to provide ample water thereby saving energy.
(m) Septic systems will last longer, work more efficiently, and the ground water will receive less pollution from this source.

These and other Objects and Advantages of the present invention will be made apparent when considering the attached specification and drawings.

DRAWING FIGURES

In the drawings, each page is listed as FIG. # with a number indicating a particular page of drawing. Each item of drawing has its own number. Different aspects of the same item have the same number but with an alphabetical suffix attached.

FIG. 1 shows prior art. This is representative of existing flapper type toilet flush valves for toilet water-closets of the gravity flow type.

FIG. 3 shows an exploded view of the invention. Basic components are numbered. Various aspects of each component are numbered and include an alphabetical suffix.

REFERENCE NUMERALS IN DRAWINGS

100. Water saving dual flush system of valving assembly.
10. Bottom Valve.
 10a. Port or Hole. Located through the disk portion of the bottom valve.
 10b. Attachment means. For attaching the Bottom Valve to the overflow pipe or valve mounting structure
 10c. Upper surface of Bottom Valve.
 10d. Bottom surface of Bottom Valve.
 10e. Valve seal portion fixed to bottom valve
 10e. Shape molded edge of the Bottom Valve surrounding the Port/Hole.
12. Pipe/tubular means of conveyance
 12a. Flange at bottom end of pipe/flanged end of pipe
 12b. Upper end of pipe/non-flanged end of pipe
14. Flotation Collar
 14a. Alternate retainer for floatation collar
 14b. Central hollow void through floatation collar.
16. Upper Valve Seat Sleeve.
 16a. Hinge arm/connective means of hinging
 16b. Hole for optional second actuation chain attachment.
 16c. Upper valve seat.
 16d. Flotation collar retainer flange.
 16e. Upper valve hinge mount.
18. Upper Valve.
 18a. Top surface of Upper Valve.
 18b. Hinge mounting arms of Upper Valve.
 18c. Flush actuation chain attachment point.
 18d. Bottom surface of Upper Valve.
20. Float and Chain assembly/connective means of floatation and valve actuation
 20a. Float Ball
30. Water closet overflow pipe including means of valve attachment
32. Flush actuation arm assembly/means of valve actuation
 32a. Representative of flush actuation for low volume flush
 32b. Representative of flush actuation for full volume flush.
34. Water-closet drain outlet/discharge outlet

ADDITIONAL EMBODIMENTS

The preferred embodiment selected for this application was selected for its ability to be universal in its application and for its ability to enter production with a minimum of tooling and production changes to existing production facilities. The following are additional embodiments consisting of differences mainly utilized to accommodate difference in toilet and water-closet designs. Some of the following embodiments are also designed with fewer components and other alterations but all remain true to the basic fundamental design shown in the preferred embodiment in both function and theory.

Figure 7:
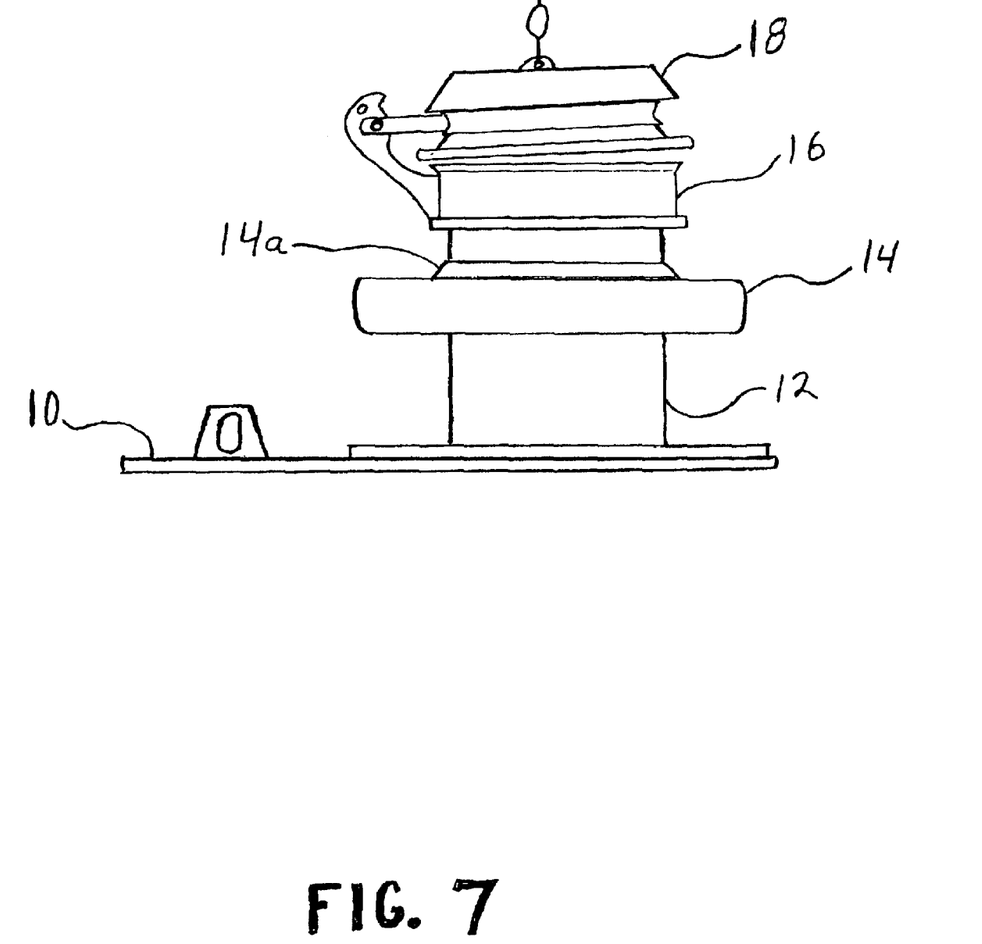
FIG. 7 represents additional embodiment #1

(1) One additional embodiment of the present invention (FIG. 7) consists of utilizing a longer pipe. This will effectively raise the inlet level of the upper valve to a pre-determined height within the water-closet When the height of the upper valve is set at an elevated position within the water-closet the amount of water that can be used is pre-determined and fixed allowing manufactures to certify low volume use standards. The upper valve may be replaced with a buoyant type valve eliminating the adjustability of the float chain assembly. Additionally, the lengthening of the pipe allows for the adjustment of the floatation collar along the axis of the pipe allowing adjustment of the bottom valve flow characteristics. In this embodiment both the upper valve and the bottom valve may be specifically timed to allow pre-determined precise quantities of water to be used during each of the flush cycles.

Figure 8:
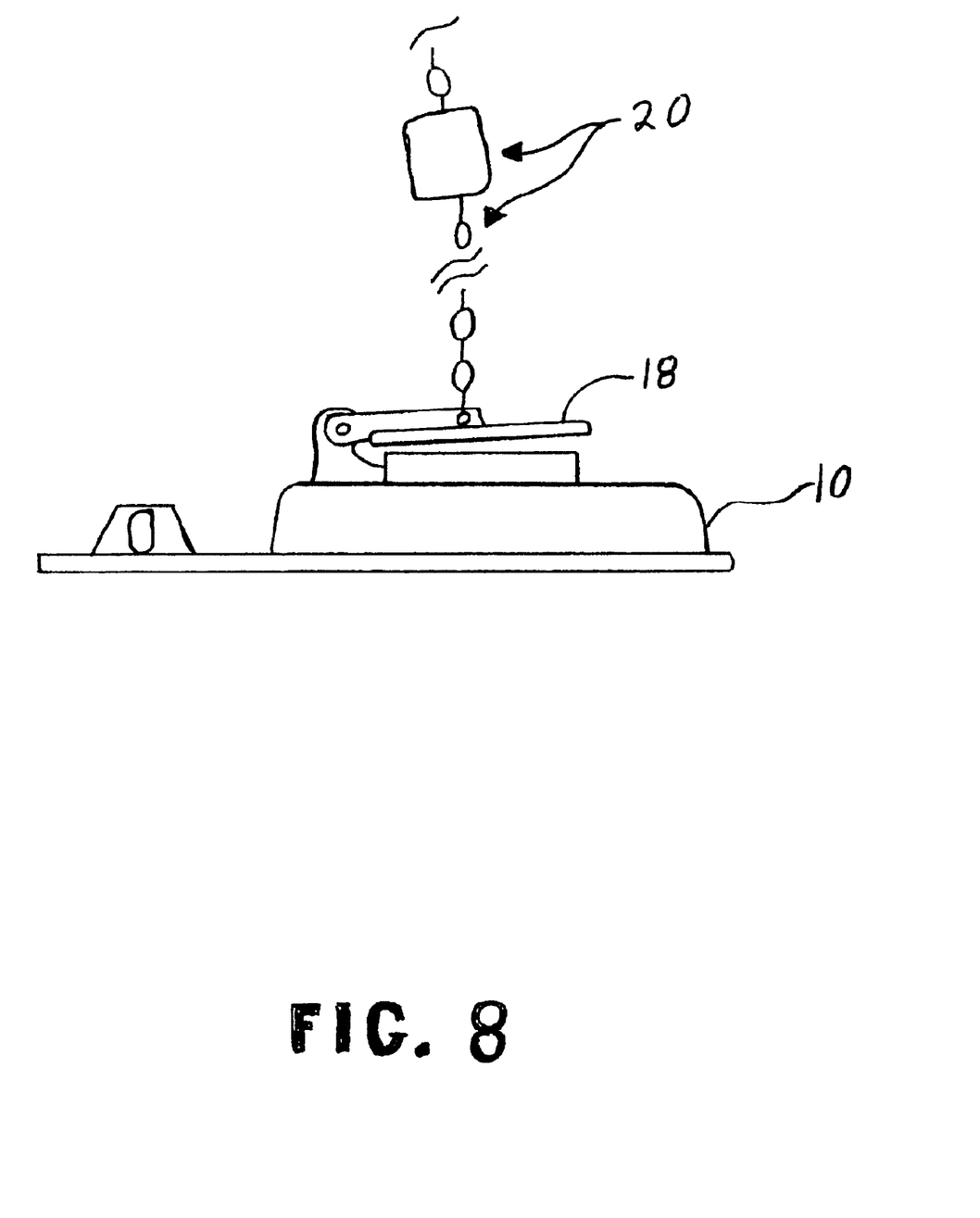
FIG. 8 represents additional embodiment #2

(2) Another embodiment of the present invention (FIG. 8) consists of a bottom valve having floatation (air or foam) molded in to the main body of the bottom valve thereby eliminating the floatation collar. Additionally, the pipe is eliminated in favor of a molded in elongated port forming a tubular means of conveyance extending through the bottom valve and the intrgul floatation. This change will allow the upper valve to be attached to a hinge means alternately fixed to the top of the molded in floatation thereby eliminating the upper valve seat sleeve.

Figure 9:
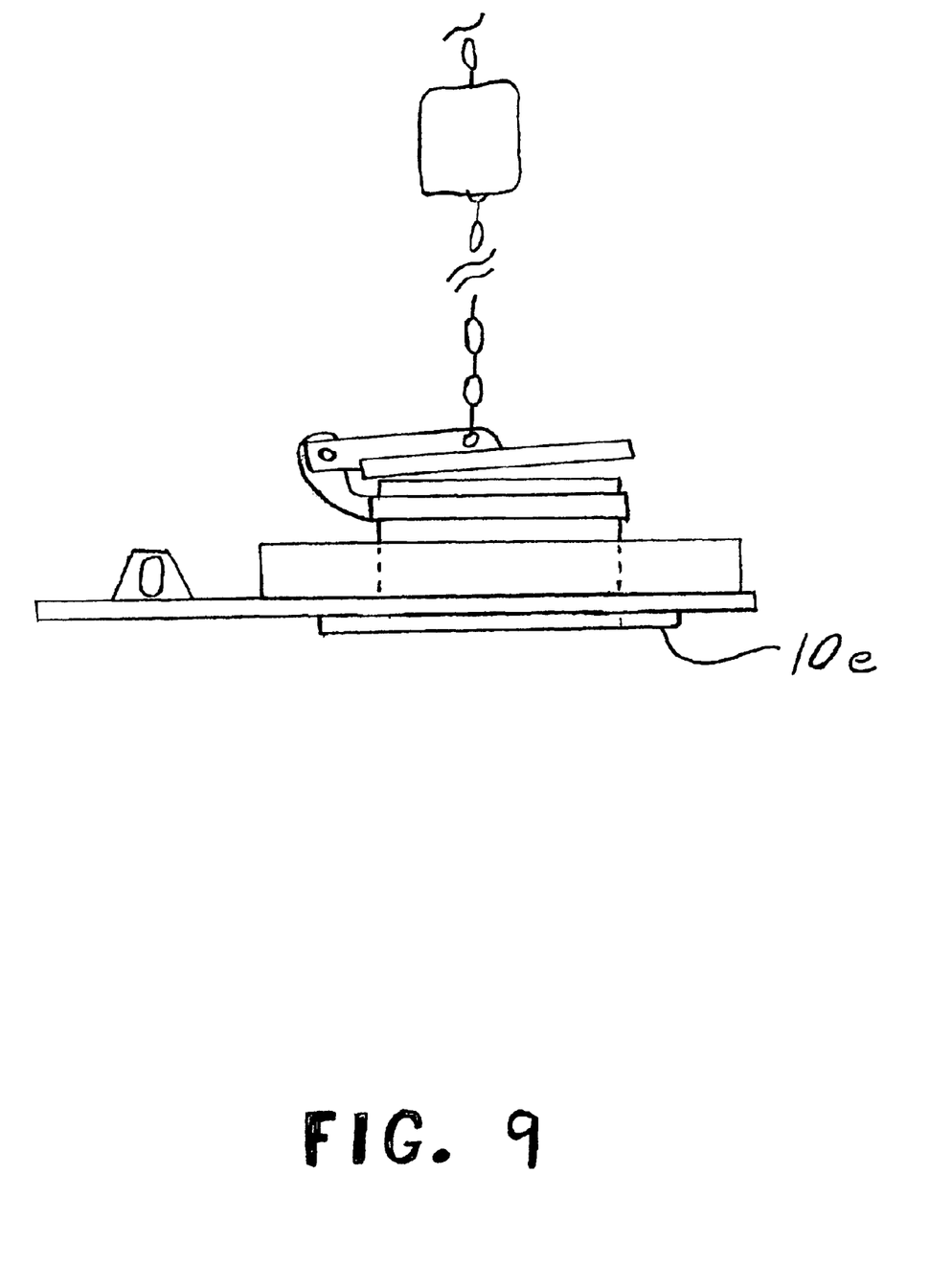
FIG. 9 represents additional embodiment #3

(3) An additional embodiment (FIG. 9) of the present invention uses a one piece plastic framework for the basis of the bottom valve having a tubular conveyance incorporated in the molding process and having the bottom valve seal portion, made of resilient material, attached to the underside or bottom of the plastic fiamework to mate with and seal to the drain outlet. The floatation collar is then positioned about the tubular means of conveyance and the valve seat sleeve is attached about the upper end of the tubular conveyance. Appropriate floatation is incorporated for the upper valve and the upper valve is attached by hinging to the valve seat sleeve. Means for actuation from the flush chain is incorporated by appropriate attachment. Additional embodiments may alternately utilize any of the following in combination:

4. A upper valve of the early close type.
5. Larger or smaller diameter pipe and alternate pipe lengths
6. Swirl fins to accelerate flow through the pipe.
7. Constricting band float retainers for alternate float collar positioning.
8. Floatation or non-floatation type upper valve.
9. Float size, shape and material variants.
10. Various types of hinge means for connecting the upper valve operatively to the other components and various means of attaching the hinge means to the tubular conveyance means.
11. The Pipe, or other tubular means of conveyance, having a upper valve seat integral to its composition.
12. The bottom valve may have various types of receiver fitments molded in at the edge of the port to receive fitment of the pipe.

These additional embodiments are not to be seen as limiting the present invention in its scope but rather to show variations available by the use of these and other alternate forms in any number of combinations.

DETAILED DESCRIPTION OF THE INVENTION

Preferred Embodiment

Generally relating to plumbing products and particularly to toilet water-closet structures.

Figure 2:
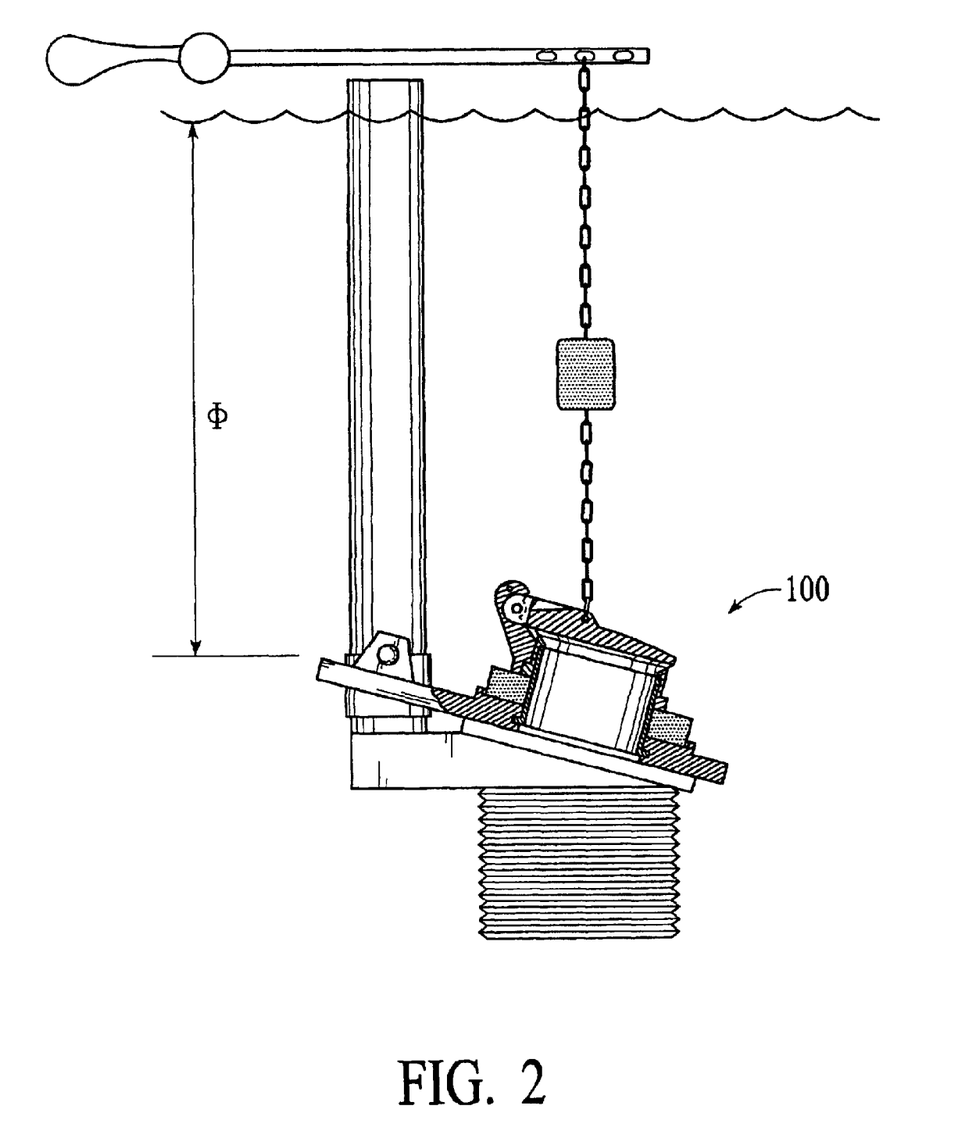
FIG. 2 shows a general representation of a water-closet with the present invention (FIG. 2-100) displayed in its seated or closed position.

A water saving dual flush system of valving for gravity flow toilets is herein described (FIG. 2-100).

Figure 1:
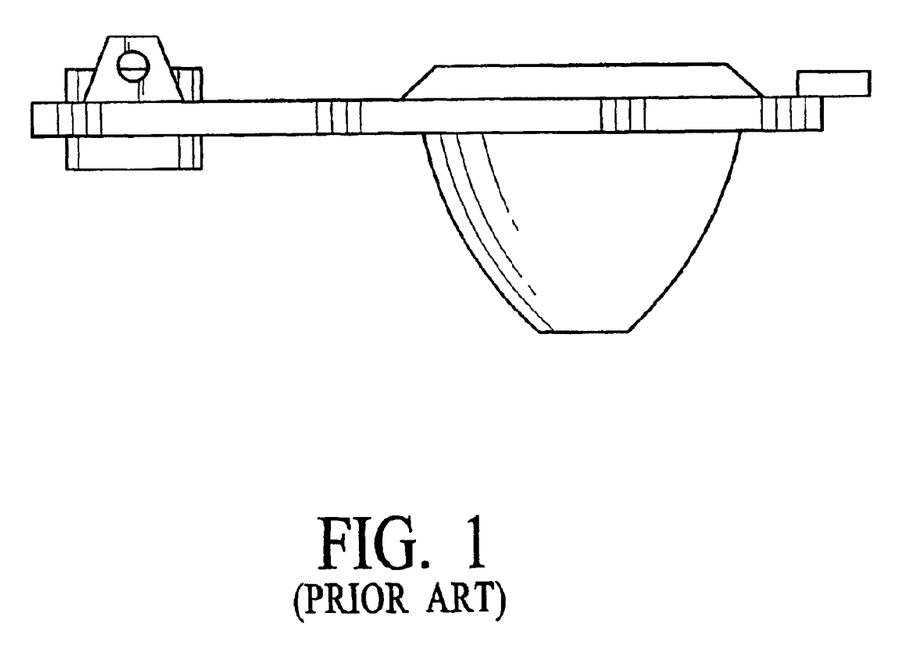

A preferred embodiment of the present invention (FIG. 3) consists of a bottom valve (10) comprised of industry standard materials and conforming to industry standard attachment methods (10b) for gravity flow toilets having a water storage tank (water-closet) and a overflow pipe (30) with a discharge outlet (34) combined therein. The bottom valve (10) being substantially similar to a common flapper type valve (FIG. 1 prior art) in size, shape and execution with the exception of the disc portion of the valve, generally located directly above the discharge outlet of the water-closet, having a port extending through the top and bottom surfaces (10a). The molded edge of the valve (FIG. 4-10e) surrounding the port of the bottom valve (FIG. 3-10a) is shape designed to mate with a flanged end of a plastic pipe (12a) of thin wall construction such as that of standard industry plumbing used for common sink drain connections and being approximately 1.25"–1.75" inch (3.2 cm –4.5 cm) inside diameter.

Figure 3:
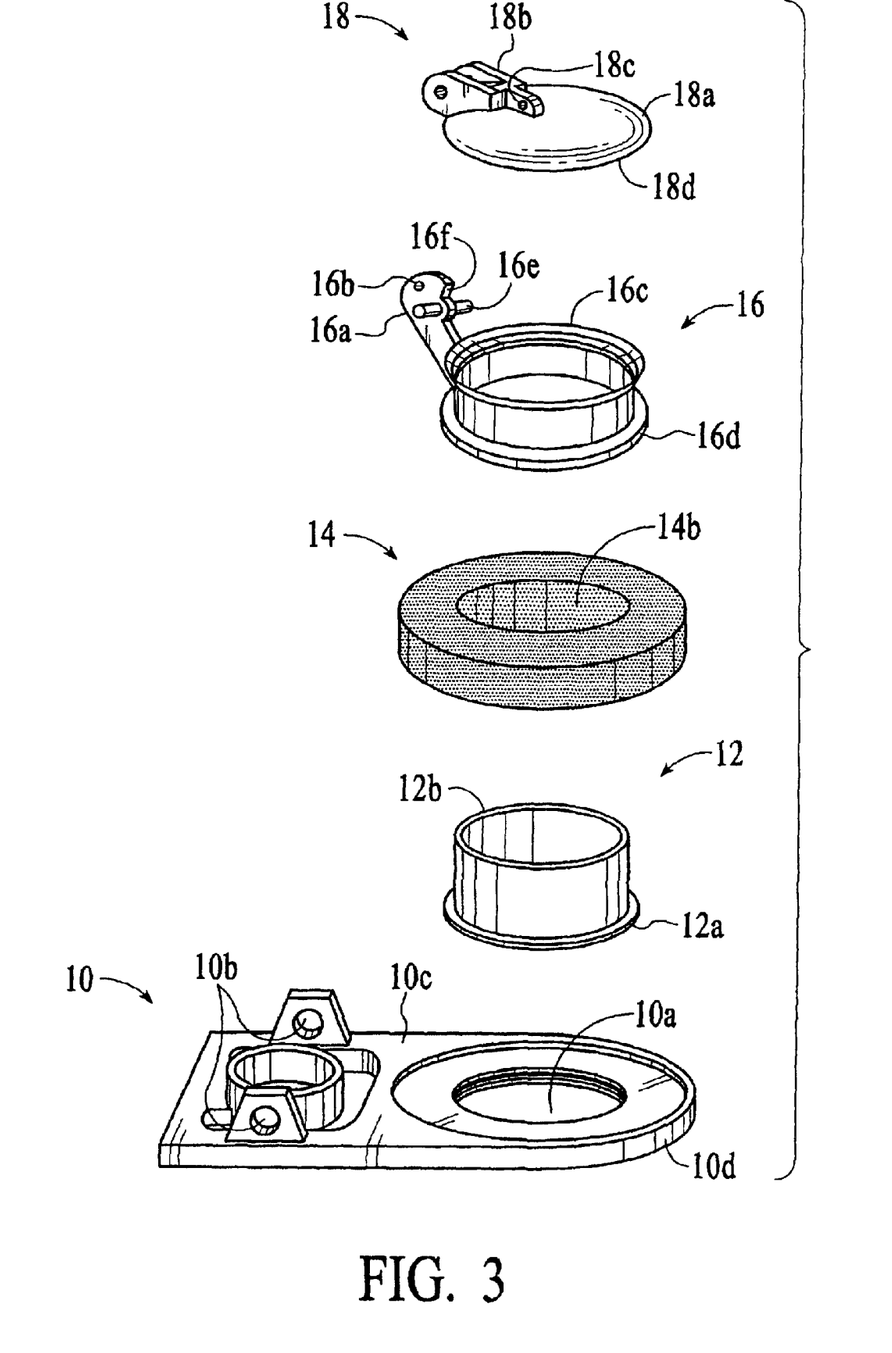
Figure 4:
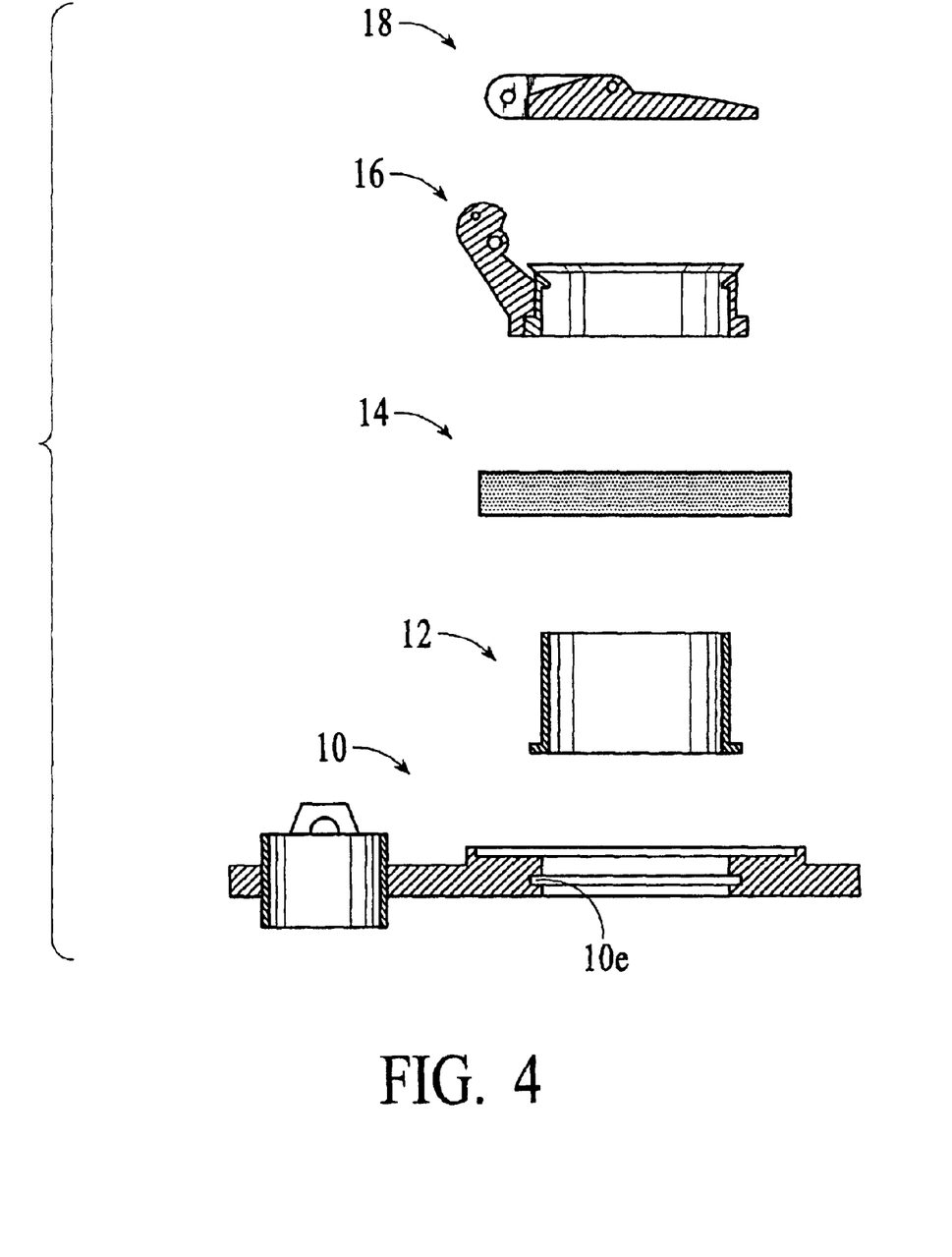
FIG. 4 shows an exploded view of the invention from a side view. Each component has its own number.

The shape molded valve area around the port section of the molded bottom valve (10a) forms a water tight fit to the inserted mating flanged end of the pipe (12a). The pipe (12) provides ridged stability to the bottom valve and a stable platform for the upper valve seat sleeve (16) in addition to being a tubular means of conveyance for water between the upper valve (18) and the discharge outlet (34) of the water-closet.

Figure 6:
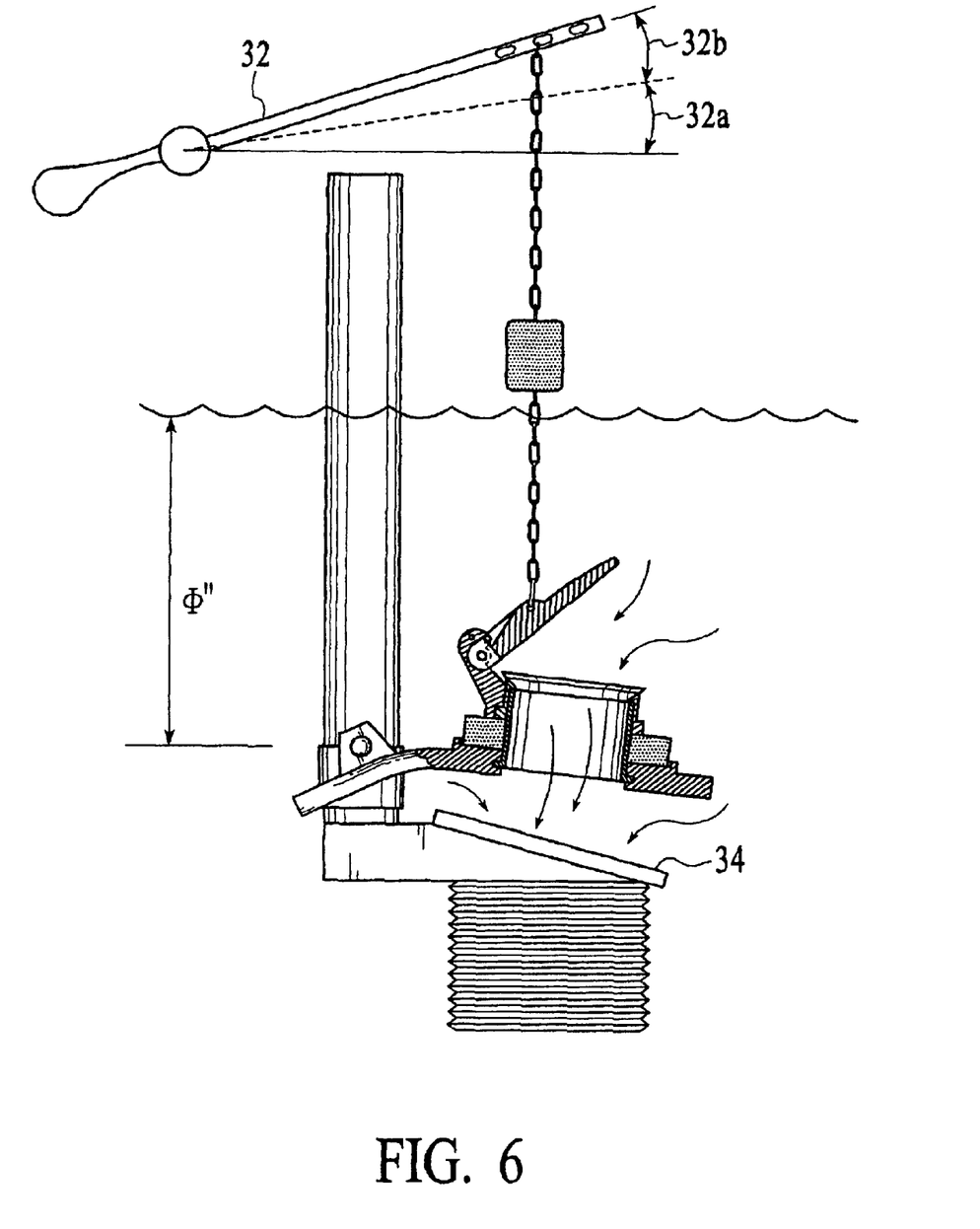
FIG. 6 shows a partial cut-away side view of the present invention in its activated full volume flush mode.

The pipe (12) receives a flotation collar (14) that is circular in shape with a circular void in its center (14b) to accept fitment around the pipe (12). The flotation collar (14) is made of a lightweight closed cell water resistant foam. The floatation collar (14) is of substantial buoyancy (adjusted by thickness) to allow floatation of the complete valve assembly (FIG. 2-100) when the bottom valve (FIG. 3-10) is unseated in its flush mode (FIG. 6). The floatation collar (14) is not buoyant enough to lift or unseat the valve assembly without flush actuation motivation (FIG. 2).

A upper valve seat sleeve (16) is slip-fit and glued to the upper non-flanged end of the pipe (12b). The upper valve seat sleeve (16) being of similar material composition as the pipe (12) and being tubular with a hollow center so as to leave the upper end of the pipe (12b) unobstructed. The upper valve seat sleeve (16) having a hinge support arm (16a) molded thereon one side. The upper end of the valye seat sleeve (16c) forming a valve seat about its upper edge for a upper valve (18) to seat and thereby forming a waterproof seal. The lower section of the valve seat sleeve (16d) is flared to act as a retainer for the floatation collar (14) thereby fixing the floatation collar position. The valve seat sleeve (16) also having a attachment point for a optional second chain attachment (16b) to accommodate dual handle flush systems. Additionally, the valve seat sleeve (16) has incorporated a upper valve stop (16f) that prevents over rotation of the upper valve thereby assuring the upper valve always returns to its seated position.

A upper valve (18) being designed with a top (18a) and a bottom (18d) surface and having incorporated a pair of arms (18b) radially extended to attach to the hinge (16e) of the upper valve seat sleeve (16) to form a hinging for attachment to, and movement of, the upper valve (18). The upper valve bottom surface (18d) being formed to cover and seal the valve seat portion of the upper valve seat sleeve (16c). A flush chain attachment point (18c) is incorporated on the top surface of the upper valve. The upper valve is comprised of materials common to industry standards and is molded to its shape and form by standard industry methods. The upper valve (18) is of the non-flotation type in this described embodiment.

Figure 5:
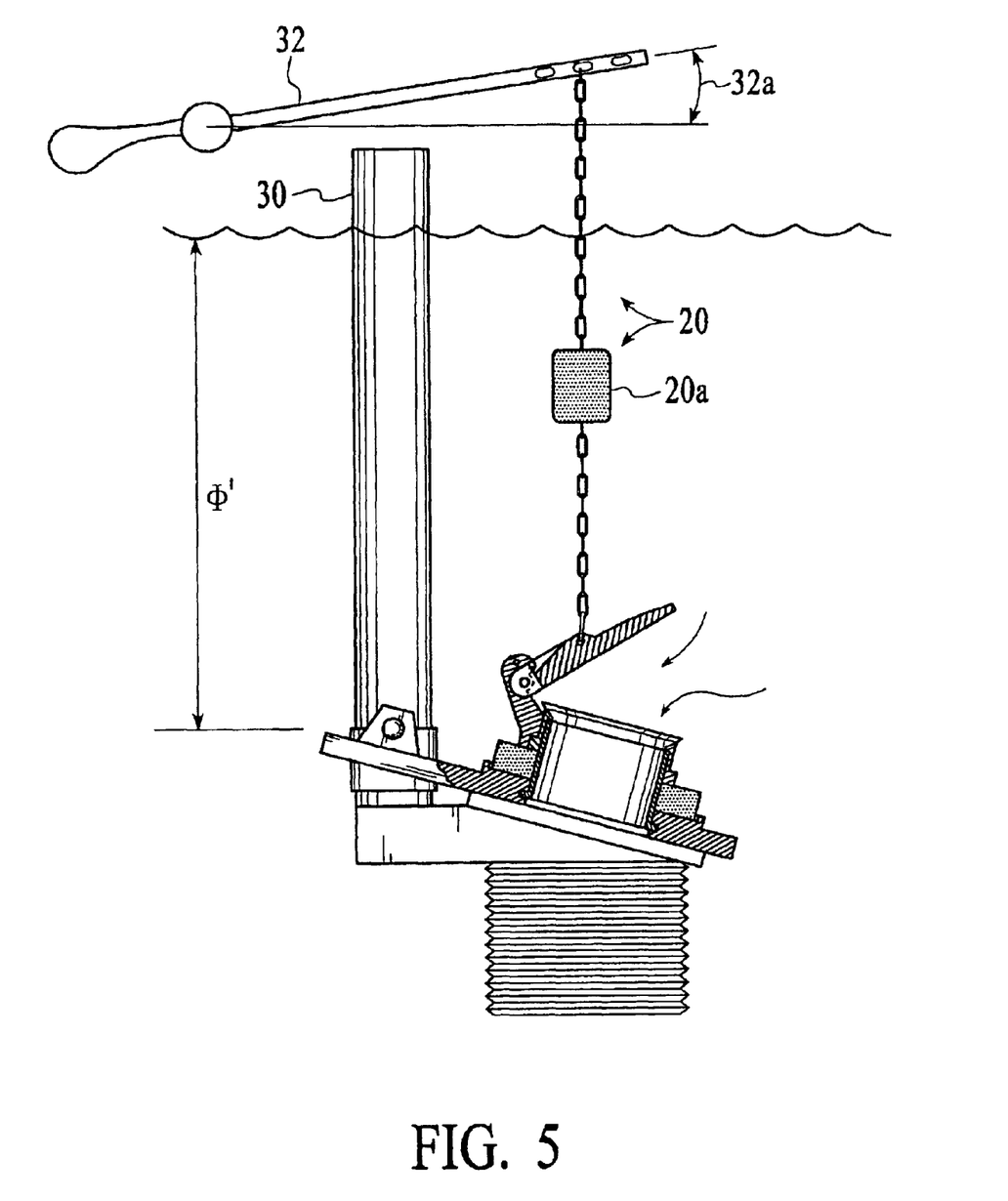
FIG. 5 shows a partial cut-away side view of the present invention in its activated low volume flush mode.

A flush activation float and chain assembly (FIG. 5-20) is attached between the upper valve chain attachment point (FIG. 3-18) and the actuation arm (FIG. 5-32) having positioned along the chain a floatation ball adjustably fixed thereto comprising a float ball and chain assembly (FIG. 5-20). The float ball (FIG. 5-20a) is of sufficient buoyancy to lift the upper valve (18) when the low volume flush mode is activated (FIG. 5). The float ball (20a) is adjustably fixed to the chain at a position that allows only a pre-determined volume of water to discharge through the upper valve (18).

ADVANTAGES

From the above, and following, description of the present invention several advantages of my Water Saving Dual Flush System of Valving become evident.
(A) This invention converts existing single flush toilets to dual flush water saving toilets instantly.
(B) This invention can be made publicly available on a large scale allowing water and energy savings to begin much faster than low flow toilet replacement programs.
(C) The costs associated with wide spread use of this invention is a small fraction of the costs associated with toilet replacement programs, waste water treatment processes, and waste water recycling programs.
(D) This system of valving pays for itself in water and energy savings within a very short period of time and the savings continue long term.
(E) Instillation and operation of this valving system is simple.
(F) This dependable system of valving is based on proven and reliable technology.
(G) This invention works in harmony with both new and old toilet designs and will allow different conservation type water-closet and toilet designs to be created specifically around this valving system.
(H) This system of valving will work with plumbing systems that were designed to operate using toilets with larger water volume flow characteristics.
(I) Materials used in the execution of various embodiments of this system of valving are readily available and inexpensive.
(J) Users of this system of valving will be rewarded with hundreds of dollars in water and energy savings and satisfaction with simple instillation, ease of operation, and excellent performance thereby encouraging wide spread acceptance and use of this water saving system of valving.

OPERATION OF INVENTION

Referring to the present invention, Water Saving Dual Flush System of Valving, when installed in a typical toilet water-closet having standard hardware associated with gravity flow toilets including a overflow pipe (32) and outlet drain fixture (34) included (FIG. 2).

The flush handle is connected to the actuation arm (FIG. 5-32) within the water-closet and a connective flush chain connects the actuation arm with the upper valve (FIG. 2). This connective arrangement provides the actuation means for both flush modes (FIGS. 5 & 6).

When the flush handle is rotated partially through its range of travel (FIG. 5-32a) it will lift the upper valve from its valve seat and thereby activate the low volume flush mode for flushing liquids (FIG. 5). The upper valve remains suspended in the water until the float, adjustably attached to the actuation chain (FIG. 5), descends to a level that allows the upper valve to again connect with its valve seat thereby terminating the discharge of water. The water-closet and toilet bowl will both automatically refill to proper levels need for the next use.

The upper valve is pivotally attached by hinged means (FIG. 3-18b) to a upper valve seat sleeve (16e). The upper valve seat sleeve is attached to the pipe conduit (12) that allows the flow of water from the water closet to the discharge outlet during the low volume flush. The upper valve seat sleeve (16) having both a hinge for attachment to the upper valve and a second attachment point (16b) for accommodating a second flush handle arrangement.

When the flush handle is further rotated through its range of travel it will, by means of the above described connections, lift the upper valve to its lift limit and thereby begin to lift the entire valve assembly (FIG. 6-32b). The upper valve with the upper valve seat sleeve and the pipe connectively attached to the bottom valve will lift as an assembly thereby releasing the bottom valve from its seat causing the second flush mode to activate (FIG. 6). The floatation collar (FIG. 3-14) attached about the pipe (12) will cause the valve assembly to suspend in the water-closet water until the water level descends sufficiently to allow the bottom valve to reseat thereby ending the larger flush volume flush.

The entire valve assembly is attached to the overflow pipe in the water-closet in the most common manner (10b) according to industry standards and individual water-closet characteristics.

DESCRIPTION OF OPERATION—USE OF INVENTION

Preferred Embodiment

Instillation: This system of valving is designed to fit existing hardware in gravity flow type water-closets. Common flapper type valve attachment points are provided to attach to new or existing overflow pipes. A flush chain, or equivalent, is provided to attach to the new or existing flush handle arm. The instillation of this valving system converts the existing toilet, or new toilets, from flapper or ball type single flush valving to a water saving dual flush system.

Operation: Partial rotation of the flush handle will open the upper valve only and allow a preselected quantity of water to flush liquid waste. Full rotation of the flush handle will open the bottom valve and release a larger quantity of water for flushing solids. Each of the flush modes provide a positive valve release feel to the handle so that the user cannot mistakenly use the wrong flush mode. Activated flush modes will complete their flush cycle and return to the ready status automatically. A dual handle flush system is accommodated by methods described in the specification.

Adjustments: This adjustable embodiment of the present valving system is capable of having the chain float positioned at various points to regulate flow. Moving the float upwardly lessens the flush volume and moving the float downwardly increases the flush volume. Satisfactory results and a complete refill of the toilet bowl indicate proper adjustment for each specific toilet instillation. The floatation collar may be alternately positioned along the axis of the pipe to regulate flow through the bottom valve.

THEORY OF OPERATION

Brief Description of the Invention

Referring to the present invention, Water Saving Dual Flush System of Valving, for gravity flow toilet flushing, particularly, a dual flush water saving toilet flush valving system to be used in common water-closet toilet tanks (FIG. 2).

Theory of Operation; Preferred Embodiment

Both upper and bottom valves are held in the closed or seated position by the head of water pressure on the upper (exposed to water) surfaces of the valve assembly against the relatively low pressure area of the outlet piping contacting the bottom surfaces of the valves.

When the flush handle is actuated partially through its range of travel it will, by means of its connective arrangement, release the upper valve from its seat. This un-seating action of the upper valve will allow water to flow through the pipe and out of the water-closet discharge outlet. Because the pipe is smaller in diameter than the discharge outlet opening of the water closet the flow is less in volume than that of the fully open bottom valve. The lower pressure in the discharge outlet remains constantly lower than the higher pressure head of water in the water closet. The bottom valve, being exposed to the head of water and the low pressure of the discharge outlet, remains pressed against its valve seat throughout the flush cycle of the upper valve.

The flow through the upper valve is sufficient to cause the flush action of the toilet to begin.

The amount of flow from the upper valve through the pipe is not enough to sustain the flush action from the bowl past the point of one complete discharge of the liquid content therefor, the flush action is terminated in sufficient time as to allow the remaining water discharge from the water-closet to accumulate in the bowl. The float ball attached to the flush actuation chain will suspend the upper valve until the float ball descends with the water level to a point that allows the upper valve to again reseat thereby ending the water discharge.

In the common water-closet the overflow pipe is supplied with a water supply tube from the ballcock valve that will allow a complete refill of the bowl so as to be ready for each subsequent use. The adjustable float ball on the actuation chain is to be adjusted to allow sufficient time for the toilet bowl to refill to the normal level thus indicating the proper float setting for the particular toilet design. A typical refill tube will supply 40% to 70% more water to the bowl than is necessary to fill the bowl and this overfill is sent directly to the sewer system. The present invention system of valving is designed to eliminate most of this overfill waste.

When the flush handle is moved further through its range of rotation it will, by means of its connections, release the bottom valve from its valve seat. The bottom valve then allows water to flow through the outlet pipe at a faster rate for a longer period of time causing a larger sustained flush for throughly removing solids from the toilet bowl and the drain-line.

The bottom valve, when lifted from its seat, is suspended by the floatation collar in the water until the water level in the water-closet has descended sufficiently to allow the bottom valve to again contact the lower pressure region of the water-closet discharge outlet thereby causing the bottom valve to reseat ending the water discharge and thereby the flush action.

The bottom valve remains seated during the flush operation of the upper valve because the lower pressure region of the discharge pipe remains in contact with the exposed lower portion of the bottom valve against the high pressure of the water (head) contacting the upper surface of the valve assembly. The floatation collar on the pipe will not lift the bottom valve from its seat, without intentional motivation, because the head of pressure on the upper surfaces of the entire valve system is greater than the surface pressure exposed to the lower surfaces of the valving that are exposed to the lower pressure of the outlet pipe.

Because the upper valve flush cycle is shorter and at a slower rate of flow it sufficiently flushes liquids and tissue while using significantly less water than a normal full volume flush.

Because the bottom valve uses faster flow and more volume for a longer duration it will flush solids efficiently and supply needed drain-line carry to prevent clogs in addition to providing the needed scorer and scrub volume needs of the toilet design.

The two valves in this system are therefor able to function independently allowing selective quantities of water for each needed use and thereby conserving water in comparison to single valve systems that use all of the available water for all flushes and those valve systems that use only a small limited amounts of water for all flush needs.

While the above description is expressed in terms relative to a preferred embodiment for the purpose of simplification, it is important to consider these terms in respect to the basic format of the essence of the invention, namely; A flapper type valve having a port through which flow is regulated by a second valve in conjunction with appropriate floatation applied.

While I believe this theory is true and descriptive of the invention it should not be construed to limit this invention in any way.

CONCLUSION, RAMIFICATIONS, AND SCOPE OF INVENTION

The reader will see by the specification, descriptions, and drawings that this system of valving offers the most simple and cost effective solution to the problem of excessive water usage in the toilet flush system. The design of this valving system, being based on a proven flapper valve format, allows for perfect fitment in water-closets with reliability that cannot be found in other dual flush innovations. Water savings from the implementation of this invention will be immediate and long lasting. Average households may be able to save approximately 26% to 34% or more of their total water usage by using this valving system. Waste treatment facilities will receive much less water to treat and the need for expensive recycling of that treated water may be minimized.

This system of valving has the ability to fit and work harmoniously with existing toilets and therefore successfully converts gravity flow toilets to water saving dual flush toilet function without expensive replacement of entire toilets or their existing hardware. Low flow 1.6 gpf toilets using this system of valving may save an additional 26% by reducing the 1.6 gpf single flush to a selectable 0.8 gpf for liquid waste while maintaining a 1.6 gpf for clearing solids. This system of valving uses only the same operational space as a common flapper or ball valve so it is able to fit in any direction within the water-closet regardless of the orientation of the overflow pipe and the drain outlet. Flow characteristic changes in this valving system are possible by simply changing the pipe length and/or diameter. Flotation type or bleed down upper valves may be used in addition to alternate floatation positioning to achieve particular flow rates and timing.

The basic design of this system of valving lends itself to many variants that can be utilized to accommodate a wide range of applications while applying the basic concept of this particular invention, distinctly; A flapper valve having a port through which flow is operatively controlled by a second valve in combination with appropriate floatation.

Manufacturers of toilets will find that they will be able to utilize a specific embodiment of this invention to pre-set specific flow rate and volume controls in their products. Additionally, manufacturers will be able to take advantage of the dual handle ready feature of this valving system to market new toilet flush handles.

The above descriptions, preferred embodiment and alternate embodiments should not be construed as limitations on the scope of this invention. Accordingly, the scope of this invention should be determined by the appended claims and their legal equivalents.

I claim:

1. A water saving dual flush system of valving for gravity flow toilet water closets having in combination a flush actuation assembly, an overflow pipe and dischrge outlet therein, said system of valving comprising:
   (a) a bottom valve having in combination, radially extended arms configured to mate pivotally to said overfow pipe, a disk portion disposed over said discharge outlet, and a port through said disk portion of said bottom valve,
   (b) a tubular means of conveyance incoporated within said port in a water tight manner,
   (c) a means of floatation configured about said tubular means of conveyance,
   (d) an upper valve seat sleeve disposed about the upper end of said tubular means of conveyance, an upper valve hingedly attached to said upper valve seat sleeve in a manner consistent with operably allowing said upper valve to rotate between open and closed positions with respect to said tubular means of conveyance and,
   (e) means for operably connecting said flush actuation assembly with said upper valve, including a flotation device, thereby allowing said means of flush actuation to operate said upper valve and said bottom valve, thereby allowing selective water saving flush volume by virtue of the two valves.

2. The tubular means of conveyance of claim 1 wherein said means is a pipe having both a upper non-flanged end and a bottom flanged end.

3. The means of floatation configured about said tubular means of conveyance in claim 1 wherein said means of floatation is a floatation collar.

4. The upper valve of claim 1 wherein said upper valve is operatively attached to said tubular means of conveyance by connection to a valve seat sleeve having at least a upper valve seat and a means of attachment to said upper valve by hinging means.

5. A water saving dual flush system of valving for a water-closet having in combination a flush actuation system and a overfow pipe with a drain outlet therein, the system of valving comprising:
   (a) a bottom valve comprising radially extended arms including means for pivotal attachment to said ovedlow pipe thereby establishing said bottom valve over said drain outlet and said bottom valve also having in combination an upper surface and a bottom surface in addition to having a port extending through the upper and bottom surfaces,
   (b) a pipe, having at least an upper end and a bottom end, is fitted within said port and mated thereto thereby establishing a conduit for flow of fluid though said pipe,
   (c) a floatation collar mounted about said pipe whereby said pipe in combination with said bottom valve may be suspended within the water-closet temporarily by the buoyancy of said collar,
   (d) a valve seat sleeve having at least an upper valve seat and an attachment arm for hinged connection is mounted about the upper end of said pipe,
   (e) an upper valve having in combination upper and bottom surfaces and mating connective hinging structure enabling said upper valve to be established operably about the upper end of said valve seat sleeve, and,
   (f) a operable connection between said flush actuation system and said upper valve and said bottom valve, including a floatation device, whereby said upper valve and said bottom valve may be selectively operated whereby the system of valving may operatively regulate predetermined quantities of water flow through said discharge outlet.

6. The bottom valve of claim 5 wherein said bottom valve is a flapper type valve comprised substantially according to industry standard size, shape, materials and execution except for having said port therein.

* * * * *